(12) United States Patent
Basak et al.

(10) Patent No.: US 8,676,631 B2
(45) Date of Patent: Mar. 18, 2014

(54) AUTOMATED ITEM PRICING

(75) Inventors: Jayanta Basak, New Delhi (IN);
Prashant Jain, Delhi (IN); Gyana R. Parija, Haryana (IN); Anupam Saronwala, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 12/364,657

(22) Filed: Feb. 3, 2009

(65) Prior Publication Data

US 2010/0198735 A1     Aug. 5, 2010

(51) Int. Cl.
*G06Q 99/00* (2006.01)
*G06Q 30/02* (2012.01)

(52) U.S. Cl.
CPC ........ *G06Q 30/0278* (2013.01); *G06Q 30/0204* (2013.01)
USPC .......................... 705/7.35; 705/26.1; 705/306

(58) Field of Classification Search
CPC ............................ G06Q 30/0283; G06Q 10/04
USPC ............ 705/26.1, 26.41, 400, 7.35, 7.33, 306
See application file for complete search history.

(56) References Cited

U.S. PATENT DOCUMENTS

| | | | |
|---|---|---|---|
| 6,502,080 B1* | 12/2002 | Eichorst et al. | 705/400 |
| 2003/0036964 A1 | 2/2003 | Boyden et al. | |
| 2003/0105728 A1* | 6/2003 | Yano et al. | 705/400 |
| 2003/0233246 A1* | 12/2003 | Snapp et al. | 705/1 |
| 2005/0187803 A1* | 8/2005 | Jain et al. | 705/7 |
| 2005/0267774 A1* | 12/2005 | Merritt et al. | 705/1 |
| 2007/0094122 A1* | 4/2007 | Dillon-Ferris | 705/37 |
| 2007/0250327 A1 | 10/2007 | Hedy | |
| 2008/0027882 A1 | 1/2008 | Allen et al. | |
| 2008/0154761 A1* | 6/2008 | Flake et al. | 705/37 |
| 2009/0006118 A1* | 1/2009 | Pollak | 705/1 |

FOREIGN PATENT DOCUMENTS

| | | | |
|---|---|---|---|
| JP | 2001357256 A2 | 12/2001 | |
| JP | 2003316881 A2 | 7/2003 | |
| WO | WO2007/002684 A1 * | 6/2006 | |

OTHER PUBLICATIONS

Jafari, Tom, "Identifying factors that Determine the Price of Used Cars", Autumn 2003, Econ 482; 6 pgs.*
"Purchasing a Car", Jun. 2003, Leading to Success in Algebra 2 Workshop; 6 pgs.*
Wu, Johnny, "Factors that Affect Private Seller Pricing of Used Cars", Dec. 8, 2004, Econ 482; 9 pgs.*
Cho, Sungjin and Rust, John; "Is Econometrics Useful for Private Policy Making? a Case Study of Replacement Policy at an Auto Rental Company", Jul. 24, 2007, 35 pages.*
Gordon, R. The Measurement of Durable Goods Prices, Chapter 8: New and Used Automobiles, pp. 321-382. Available at http://books.google.com/books?id=e9Pu-bVcfQkC&dq=The+Measurement+of+Durable+Goods+Prices&printsec=frontcover&source=bn&hl=en&ei=QwOwSbPlG4H8tgfYyMHQBQ&sa=X&oi=book_result&resnum=4&ct=result#PPA321,M1.

(Continued)

*Primary Examiner* — John Hayes
*Assistant Examiner* — Freda A Nelson
(74) *Attorney, Agent, or Firm* — Ryan, Mason & Lewis, LLP

(57) ABSTRACT

Techniques for automated pricing of an item are provided. The techniques include obtaining historical data of one or more previous purchases for the item, performing a regression on the historical data, and using the regression to obtain a buying price and a selling price for the item.

17 Claims, 6 Drawing Sheets

(56) References Cited

OTHER PUBLICATIONS

Hedonic Regression. http://en.wikipedia.org/wiki/Hedonic_regression, downloaded Mar. 5, 2009.
Edmunds. www.edmunds.com, downloaded Mar. 5, 2009.
Kelly Blue Book. www.kbb.com, downloaded Mar. 5, 2009.
CarWale. www.carwale.com, downloaded Mar. 5, 2009.
Parker's. www.parkers.co.uk/cars/used-prices/, downloaded Mar. 5, 2009.
Griffin, K. How to Value a Used Car. About.com. http://usedcars.about.com/od/valuatingausedcar/ss/Used_Values.htm, downloaded Mar. 5, 2009.

* cited by examiner

AUTOMATED ITEM PRICING

FIELD OF THE INVENTION

Embodiments of the invention generally relate to information technology, and, more particularly, to item pricing.

BACKGROUND OF THE INVENTION

Changing consumer demographics, shrinking product life-cycle and easy financing are bringing about a change in the automotive markets worldwide. One problem that exists is information asymmetry (for example, a lemons market). In such a scenario, a seller is more informed than the buyer, and a buyers' decision can be driven by average price. Used vehicles of average quality dominate, and a further reduction in average price as well as an unstable market results. Additionally, used vehicle prices can be highly influenced by consumer-to-consumer (C2C) transactions.

By way of example, used car owners (end-users) want to sell their cars, and there are buyers (end-users) who can buy the used cars. However, even though the car owners are typically fully aware of the condition of the cars they are trying to sell, the buyers are not. In some instances, even the sellers are not completely aware of the condition of the car to allow them to determine the best price they can get for their used cars. More importantly, the buyers only have a partial view because they typically do not properly know the condition of the car.

In such a scenario, it can be very difficult to sell the cars through an auction mechanism. Because the buyers only have a partial view, the bids will be on the lower side and therefore even if a car is in good condition, it will not be able to derive as good a price as possible.

In another example, a third party operator (for example, one with sufficient expertise in judging the condition of a car) can buy the used cars from the sellers. The third party can then do some refurbishment of the car (if required) and sell these used cars to the potential buyers. In such a situation, where the third party is an authority in judging the condition of the cars, the sellers can be more confident that they can get the actual value of the used cars. Also, the buyers can trust the third party and buy the used cars at the offered price.

In exemplary marketplaces, as described above and herein, there can be two kinds of buyers and sellers: third-party (TP) buyers and sellers, and end-use (EU) buyers and sellers.

Problems can arise, however, in that once the third party buys a used car from an EU-seller, the third party needs to refurbish the car and then hold it in its own inventory until a point of time in the future when the third party is able to sell the used car to an EU-buyer. For example, if a car is held in the inventory for a long time, the value of the car likely decreases, and there is also a cost associated with holding an inventory. Additionally, a third party would not want to offer a price to the EU-seller that is higher than the price offered to an EU-buyer. Therefore, a third party will likely not buy a used car from an EU-seller that is higher than the selling price. In general, the higher the price that a third party offers to the EU-sellers, the higher the likelihood is that the EU-seller will sell the car to the third party. Similarly, the lesser the price that the third party offers to the EU-buyers, the higher the likelihood is that an EU-buyer will buy the used car from the third party (with less waiting time in the inventory).

As such, there exists a need for automated centralized pricing techniques for third party market operators of used vehicles that can enable, for example, creation of a stable market, information symmetry, stable pricing and efficient inventory management.

SUMMARY OF THE INVENTION

Principles and embodiments of the invention provide techniques for automated item pricing. An exemplary method (which may be computer-implemented) for automated pricing of an item, according to one aspect of the invention, can include steps of obtaining historical data of one or more previous purchases for the item, performing a regression on the historical data, and using the regression to obtain a buying price and a selling price for the item.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
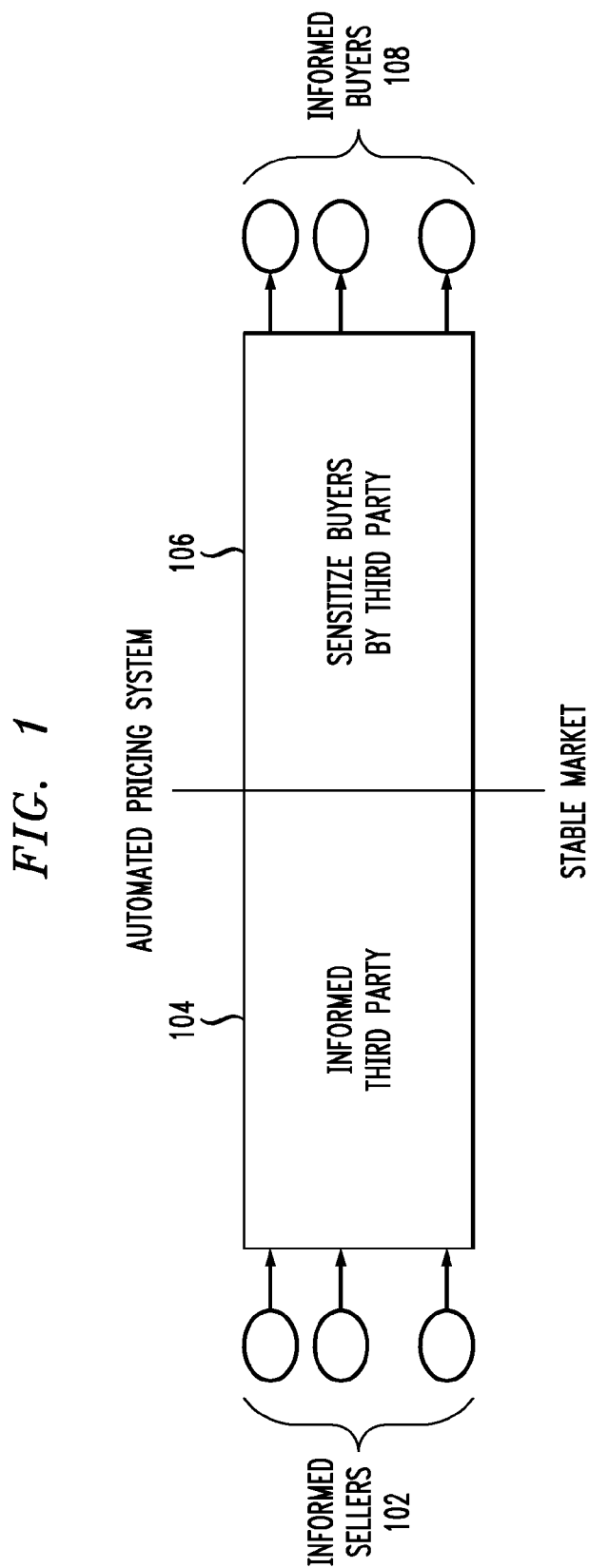
FIG. 1 is a diagram illustrating an automated pricing system, according to an embodiment of the present invention.

Principles of the invention include automated vehicle (for example, used vehicle) pricing techniques for a third party operator. One or more embodiments of the invention include techniques for a third party to determine both the buying price and the selling price for used cars such that it yields a maximum benefit to the third party.

To address the challenges and constraints of the existing approaches noted above, the techniques described herein include a third party leveraging a mechanism that is different from that followed in an auction site. The third party has to bear certain costs (refurbishment, inventory and/or yield management) and also needs to make sure that it maximizes the his or her benefit (such as, for example, revenue and/or income) in the process (that is, the price at which the third party buys the used cars from the EU-sellers should be less than the price at which it sells the used cars to the EU-buyers).

As described herein, one or more embodiments of the invention include determining a buying price and a selling price combination for the third party operator that helps the third party to maximize his or her benefit. The techniques detailed herein also allow the third party to offer reasonable prices to the EU-sellers and to the EU-buyers while ensuring that there is minimal inventory holding time (that is, the value of the car does not depreciate much in the inventory).

One or more embodiments of the invention include determining the value of a vehicle (for example, a car, truck, motorcycle, boat, etc.) based on a utility/value function corresponding to one or more parameters of a vehicle. Additionally, the value of the car derived from the value/utility function can be normalized, taking into account historical depreciation data. Also, the value can be optimized, taking into consideration a profit region for both buyers and sellers.

In addition, in contrast to disadvantageous existing approaches, the techniques described herein can include performing both buying and selling price estimations together. Also, in one or more embodiments of the invention, a third-party operator can perform revenue management in their line-of-business. The techniques detailed herein can adapt to a changing market scenario, and take into account of the environmental factors and user perception (for example, by fitting logistic regression models to past transaction data for buying price determination and analyzing the waiting time for selling price determination) in addition to the car parameters. Also, one or more embodiments of the invention can be extended to used items whose value depreciates over time such as, for example, electrical/electronic equipments, household goods, furniture, books, etc.

As described herein, techniques for estimating the utility and/or value function from historical data can include the following components. One can parameterize the value function for certain vehicle parameters, as well as express the value of the car in terms of a parametric function. Also, the value of the car can be normalized in terms of the depreciation. From the success and failure cases in buying used vehicles by the third party stored in the database, one or more embodiments of the invention can formulate a logistic regression function. Also, one can perform a constrained optimization of the logistic regression with non-zero utilities, and model the buying probability function. Further, one can model the selling probability of refurbished vehicles from the waiting time in the inventory.

By way of example, a used vehicle can be represented as $x=[x_1, x_2, \ldots, x_n]$, with the value of the vehicle represented as $$v(x) = a_0 + \sum_i a_i u_i(x_i)$$

and where $u(x\_i)$ represents the utility of a particular attribute I, with the coefficient $a\_i \geq 0$. Additionally, by way of example, let V be the price offered to the seller of the vehicle by the automated pricing system, and let B denote a random variable in $\{0,1\}$ denoting the success or failure (success: if the seller sells the vehicle to the third party operator, failure: if he doesn't sell).

The probability of success can be a logistic function:

$$P(B = 1 \mid V, x) = \frac{1}{1 + \exp(-m(V - v(z)))};$$

$$v(z) = \sum_{i=0}^{n} a_0 z_0;$$

$$z_0 = 1.$$

Probability of failure can be represented as follows:

$$P(B = 0 \mid V, x) = \frac{\exp(-m(V - v(z))}{1 + \exp(-m(V - v(z)))}$$

Sets and parameters can include, for example, N previous instances available to the third party. Also, S can be the set of success deals, and F can be the set of failure deals, so that $N = |S| + |F|$. Additionally a previous instance can be denoted as $(z^{(j)}, V^{(j)}, B^{(j)})$.

A likelihood function can be represented as follows:

$$L = \log\left(\prod_{j \in S} \frac{1}{1 + \exp(-m(V^{(j)} - v(z^{(j)})))} \prod_{j \in F} \frac{\exp(-m(V^{(j)} - v(z^{(j)})))}{1 + \exp(-m(V^{(j)} - v(z^{(j)})))}\right)$$

or, equivalently, $$L = m \sum_{j \in F} (v(z^{(j)}) - V^{(j)}) - \sum_{j=1}^{N} \log(1 + \exp(-m(V^{(j)} - v(z^{(j)}))))$$

A non-linear optimization task can be represented as follows:

$$\text{Maximize: } m \sum_{j \in F} \left(\sum_i a_i^{(j)} z_i^{(j)} - V^{(j)}\right) - \sum_{j=1}^{N} \log\left(1 + \exp\left(-m\left(V^{(j)} - \sum_i a_i^{(j)} z_i^{(j)}\right)\right)\right);$$

subject to: $a_i \geq 0$ for all $i \in \{0, 1, \ldots, n\}$.

In one or more embodiments of the invention, the third party operator can sell a used vehicle after refurbishment. Let the value of the refurbished vehicle at the outlet of the third party be represented as $v(z)+k$. Also, let C denote a random variable in $\{0,1\}$ indicating the failure or success of selling the vehicle in the true value outlet. As such, $$P(C = 1 \mid V, x) = \frac{1}{1 + \exp(-m(v(z) + k - V))}.$$

In one or more embodiments of the invention, samples bearing failure cases in the outlet of third party do not exist (due to benefit consequences). Also, a third party can reduce the price at the outlet if there is a long waiting time.

Average waiting time in the outlet can be represented as $$\hat{t} = \sum_{t=1}^{\infty} t(1-P)^{t-1} P.$$

Also, average waiting time can be represented as $$\hat{t} = \frac{1}{P}.$$

Let W be the units of waiting time for the refurbished vehicle at the outlet with a price v(z)+k. As such, $$v(z) + k - V = -\frac{1}{m}\log(W-1).$$

Further, an average of the past sold samples can be used to approximate the relationship.

As described herein, techniques for obtaining the best (buying price and selling price) combination through revenue management model can include the following components. One can obtain an operating region from the buying probability and selling probability curves, as well as estimate the profit per unit vehicle from the operating region. Additionally, one can optimize the profit per unit vehicle to obtain the best (buying, selling) price combination across the vehicle of same category (model and make). The techniques described herein are extensible to include inventory capacities and/or costs at a dealership, and are extensible to a dealership network within a city for sharing inventories.

In one or more embodiments of the invention, for example, a third party buys a vehicle from an informed seller at a price v(z)+a, where "a" is the incentive. Then, the probability of buying the vehicle from the seller (success) can be represented as $$P_b = \frac{1}{1 + \exp(-ma)}.$$

Additionally, let the third party profit=r, and refurbishment cost=b. As such, the probability of selling the vehicle at the outlet can be represented as $$P_s = \frac{1}{1 + \exp(-m(k-(a+b+r)))}.$$

Further, the expected profit per vehicle by the third party can be represented as $$G = P_b(r - cw) = P_b\left(r - \frac{c}{P_s}\right);$$

that is, $$G = \frac{r - c - c\exp(-m(k-(a+b+r)))}{1 + \exp(-ma)}.$$

As described above and herein, and in contrast to disadvantageous existing approaches, the techniques described herein include a combination of buying and selling price determination from the logistic regression and inventory modeling. Further, one or more embodiments of the invention include subsequent optimal point determination.

FIG. 1 is a diagram illustrating an automated pricing system (for example, in a stable market), according to an embodiment of the present invention. By way of illustration, FIG. 1 depicts informed sellers 102, who sell vehicles to an informed third party 104. The informed third party 104 sensitizes buyers in step 106 and sells the vehicles to informed buyers 108.

Figure 2:
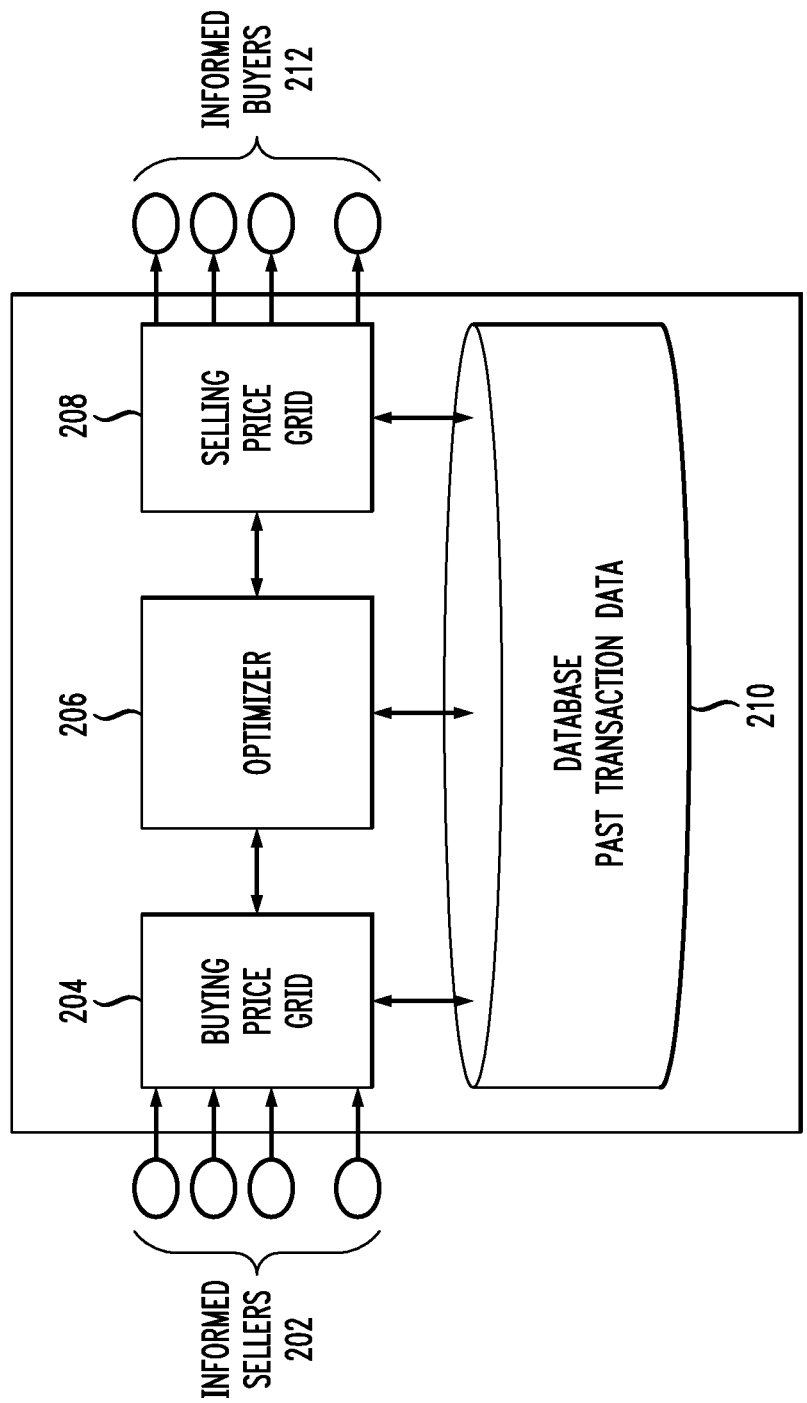
FIG. 2 is a diagram illustrating an automated pricing system, according to an embodiment of the present invention.

FIG. 2 is a diagram illustrating an automated pricing system, according to an embodiment of the present invention. By way of illustration, FIG. 2 depicts informed sellers 202, who provide inputs to a buying price grid 204, which interacts with an optimizer 206 as well as a database of past transaction data 210. The optimizer 206 and the database of past transaction data 210 interact with each other as well as with a selling price grid 208, which provides outputs to informed buyers 212.

Figure 3:
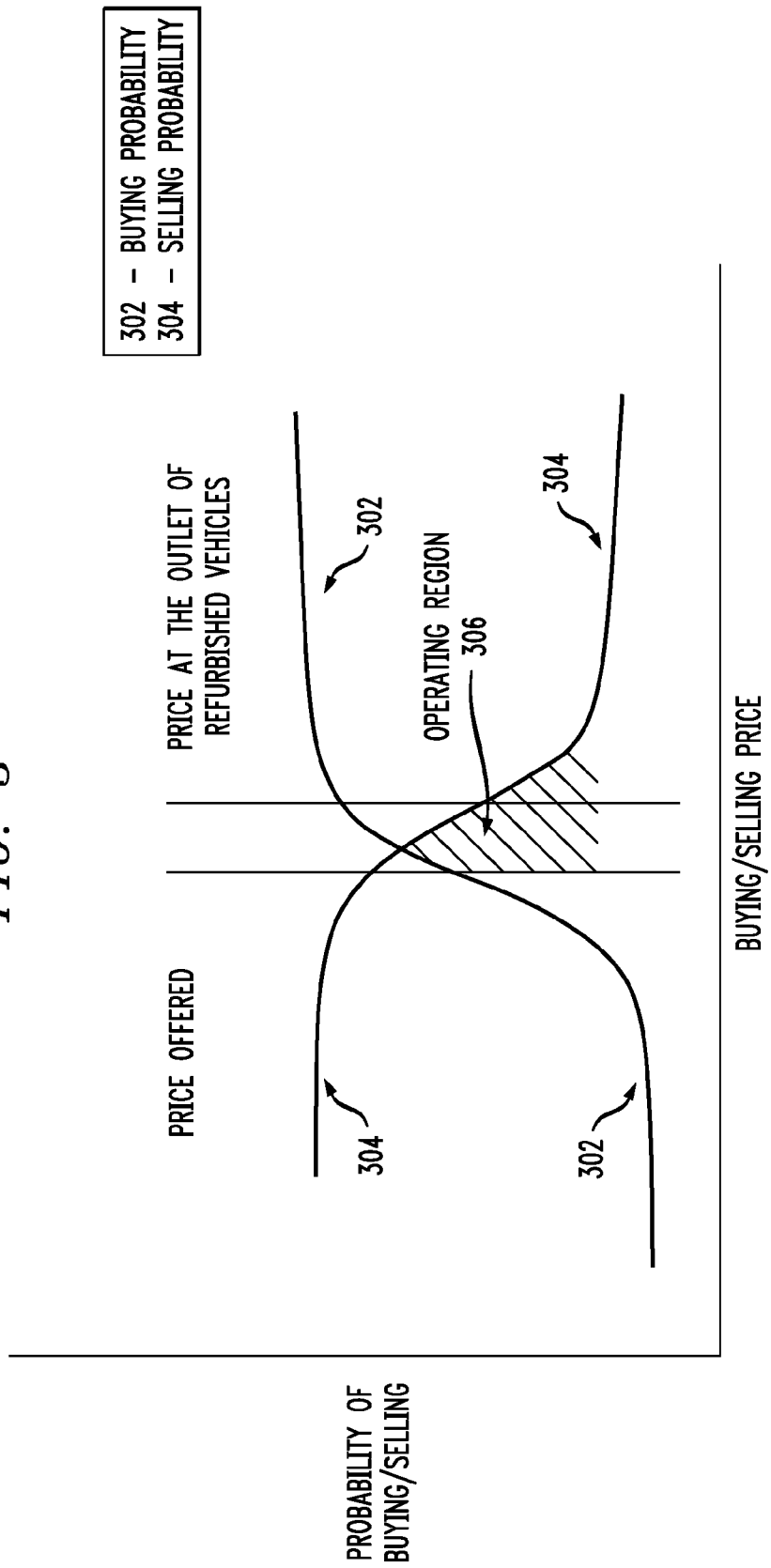
FIG. 3 is a diagram illustrating the probability of buying and selling, according to an embodiment of the present invention.

FIG. 3 is a diagram illustrating the probability of buying and selling, according to an embodiment of the present invention. By way of illustration, FIG. 3 depicts a buying probability curve 302, a selling probability curve 304, and an operating region 306. As illustrated in FIG. 3, the probability curves 302 and 304 cover the price offered as well as the price at the outlet of refurbished vehicles.

In one or more embodiments of the invention, maximizing profit can be represented as:

$$\exp(-ma) = \frac{c\exp(-m(k-(b+r))) + \sqrt{c^2\exp(-2m(k-(b+r))) + c(r-c)\exp(-m(k-(b+r)))}}{r-c}$$

Also, a profit equation (herein referred to as Equation_Profit) can be denoted as follows: for a>0, r≥c+3c exp(mg(1−λ)), wherein g=(b+r), and $$\lambda = \frac{k}{b+r}.$$

Figure 4:
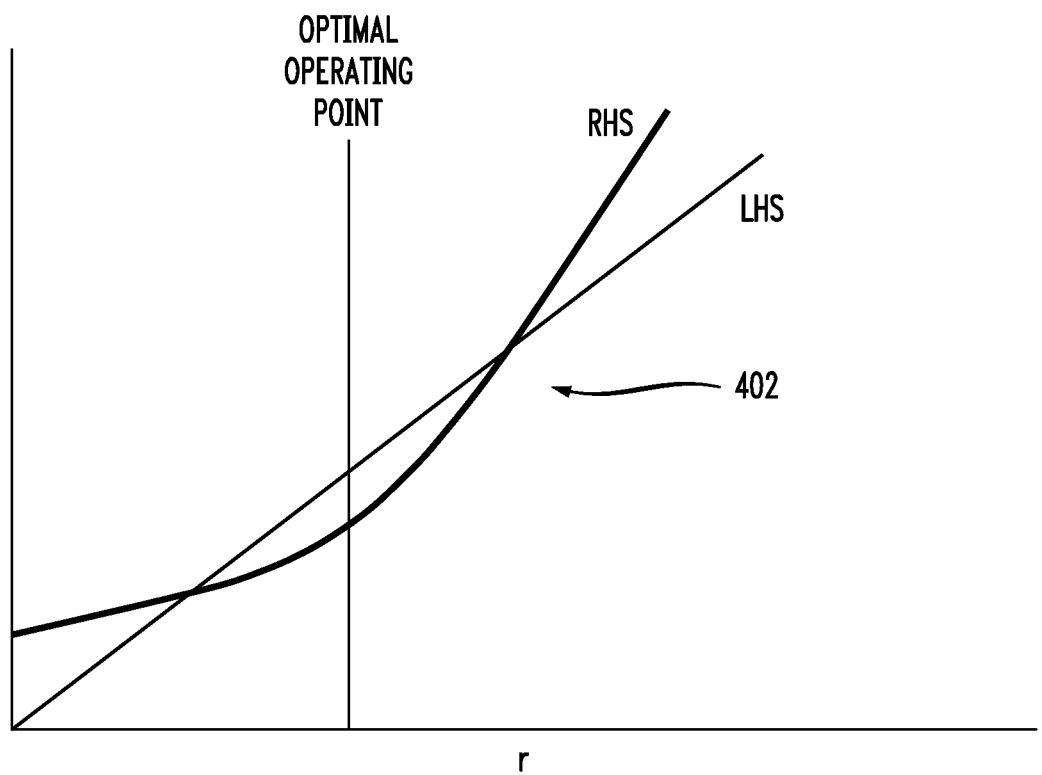
FIG. 4 is a diagram illustrating an optimal operating point, according to an embodiment of the present invention.

FIG. 4 is a diagram illustrating an optimal operating point 402, according to an embodiment of the present invention. By way of illustration, FIG. 4 depicts a curve of the right-hand side (RHS) of the above profit equation (that is, Equation_Profit), a curve of the left-hand side (LHS) of the above profit equation (that is, Equation_Profit) and an optimal operating point.

Figure 5:
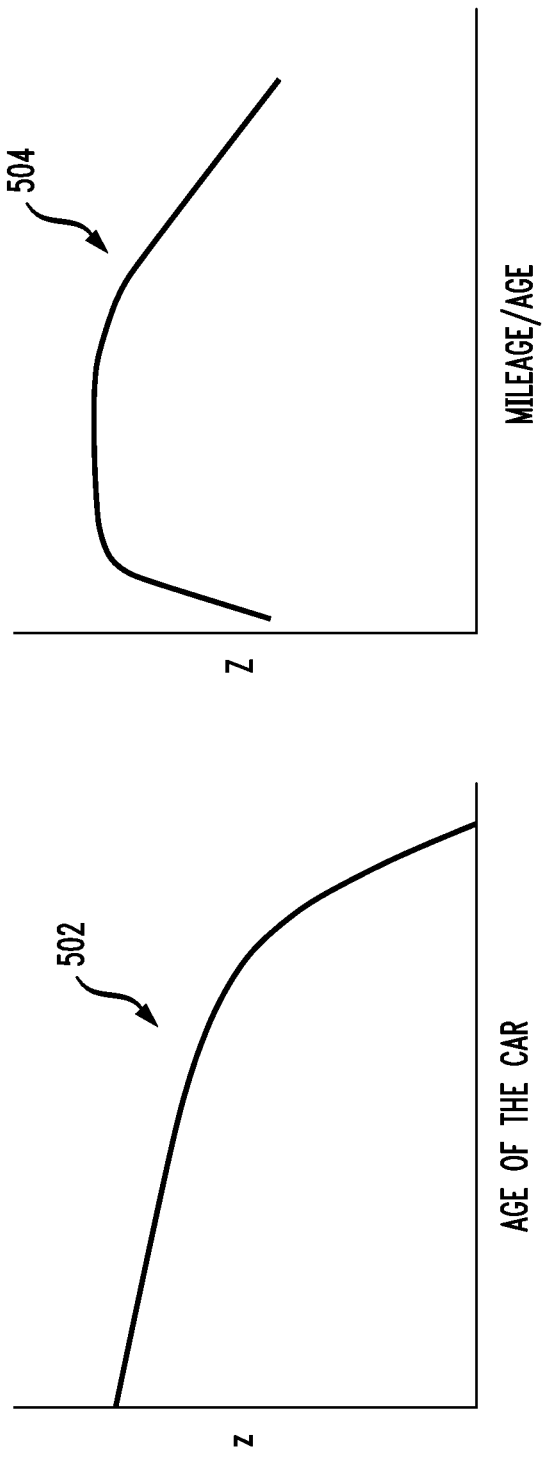
FIG. 5 is a diagram illustrating examples of utility of vehicle attributes, according to an embodiment of the present invention.

FIG. 5 is a diagram illustrating examples of utility of vehicle attributes, according to an embodiment of the present invention. By way of illustration, FIG. 5 depicts a utility graph for the age of a car 502 and a utility graph for the mileage/age of a car 504.

Figure 6:
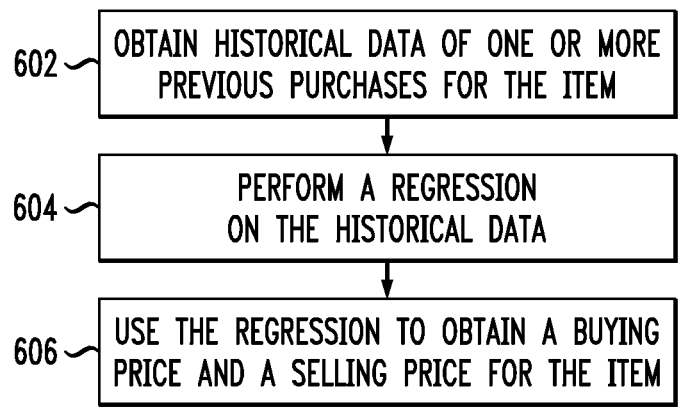
FIG. 6 is a flow diagram illustrating techniques for automated pricing of an item, according to an embodiment of the present invention.

FIG. 6 is a flow diagram illustrating techniques for automated pricing of an item, according to an embodiment of the present invention. Step 602 includes obtaining historical data of one or more previous purchases for the item. Obtaining historical data of previous purchases of the item can include obtaining historical data of purchases of a used version of the item and/or a new version of the item (for example, the price of a new version of the item (at the same time of purchase of the same item)).

The historical data of previous purchases of the item can include a price of the item over a selected time period, and wherein obtaining the historical data can further include performing a price normalization over the selected time period by analyzing a past pricing trend (for example, via using function learning tools). Also, the historical data of previous purchases of the item can include historical data indicating success and failure in purchasing a used version of the item.

Step 604 includes performing a regression (for example, a logistic regression) on the historical data. Step 606 includes using the regression to obtain a buying price and a selling price for the item. Using the logistic regression to obtain a buying price and a selling price can include using the logistic regression to obtain a buying price and a selling price that optimizes revenue for a third party, wherein the third party is buying the item from a first party and selling the item to a second party. Also, one or more embodiments of the invention include creating models for one or more regions with third party outlets, as well as quantifying a similarity (or dissimilarity) between the models to obtain segregation in a customer base.

Additionally, one or more embodiments of the invention include incrementally adapting the model parameters. Also, the techniques depicted in FIG. 6 can also include using the regression to perform vehicle bidding.

One or more embodiments of the invention can also include obtaining one or more parameters of the item. In one or more embodiments of the invention, the item can be a vehicle, and the parameters can include, for example, mileage, age of the vehicle, make and model, location, and/or waiting time in an inventory of a used vehicle against its price. Further, in one or more embodiments of the invention, performing a regression on the historical data includes taking into account the parameters of the item.

The techniques depicted in FIG. 6 can also include making an optimal point (for example, an optimal third-party profit (that is, "r" in the above-detailed equations)) determination. Further, as described herein, in one or more embodiments of the invention, a logistic regression is performed in such a way that the factors (for example, the coefficients of the parameters) are all non-negative. By way of example, one can consider that every attribute of a car contributes to an extent to the value of the car (in the worst case it can be zero). Therefore, one can perform a constrained logistic regression. With the logistic regression model, one can obtain a buying probability curve for a third party that shows the probability of successfully purchasing a used car from an EU-seller as a function of the value of the car decided by the third party.

Additionally, in one or more embodiments of the invention, one can use an inventory modeling technique to obtain a selling probability curve for a third party that shows the probability of a used car being sold to the buyers as function of the price of the car determined by the third party. Consequently, the third party can derive both the buying probability curve and the selling probability curve with a normalized value of the car. Therefore, the third party can derive the operating region using these two curves, which indicates a range of values of a car.

For each possible value of the car in this region, the third party can derive the expected benefit (profit) for the car, and derive the likeliness that a transaction will be successful. Using these constraints, the third party operator can decide an operating point in the operating region.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 7:
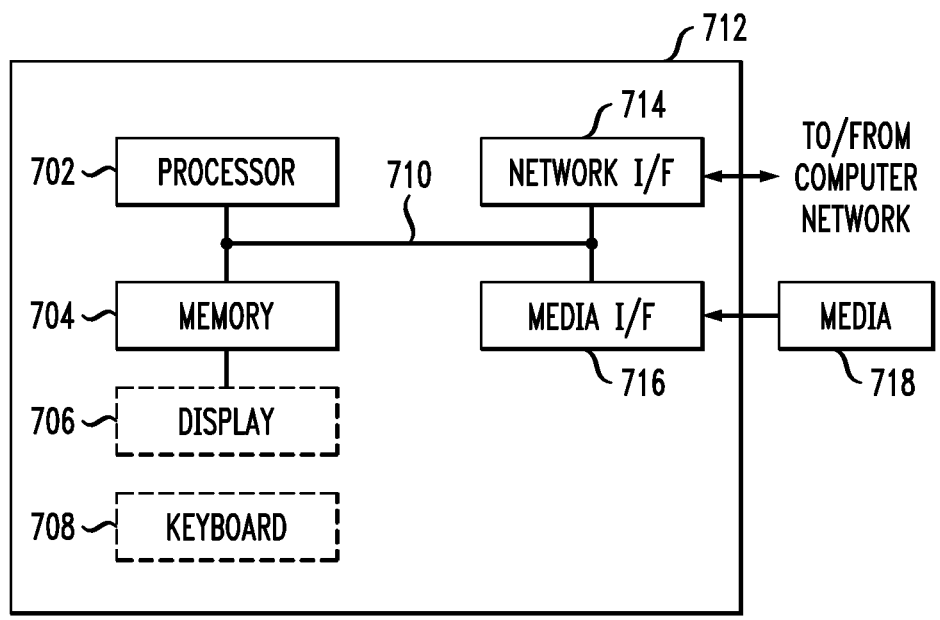
FIG. 7 is a system diagram of an exemplary computer system on which at least one embodiment of the present invention can be implemented.

At present, it is believed that the preferred implementation will make substantial use of software running on a general-purpose computer or workstation. With reference to FIG. 7, such an implementation might employ, for example, a processor 702, a memory 704, and an input and/or output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 702, memory 704, and input and/or output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 704), magnetic tape, a removable computer diskette (for example, media 718), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, combining a buying and a selling price determination from the logistic regression and inventory modeling.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for automated pricing of an item, comprising the steps of:
    obtaining historical data of one or more previous purchases for the item, wherein obtaining historical data is carried out by a module executing on a hardware processor;
    performing a regression with non-zero utilities on the historical data to obtain a buying probability curve for a third party that shows the probability of successfully purchasing the item as a function of value of the item and to obtain a selling probability curve for the third party that shows the probability (P) of the item being sold as a function of price of the item, wherein performing the regression comprises taking into account refurbishment costs of the third party via $$P(C=1 \mid V, x) = \frac{1}{1+\exp(-m(v(z)+k-V))},$$

wherein C denotes a random variable in {0,1} indicating failure or success of selling the item, V is a price of the item (x) offered to the third party, and v(z)+k represents the value of the refurbished item, and wherein performing a regression on the historical data is carried out by a module executing on a hardware processor; and
    using the regression to obtain a buying price and a selling price for the item that optimizes revenue for the third party by deriving an operating region using the buying probability curve and the selling probability curve, wherein the third party is buying the item from a first party and selling the item to a second party, and wherein using the regression to obtain a buying price and a selling price is carried out by a module executing on a hardware processor.

2. The method of claim 1, wherein the item comprises a vehicle.

3. The method of claim 2, further comprising using the regression to perform vehicle bidding.

4. The method of claim 1, wherein obtaining historical data of one or more previous purchases for the item comprises obtaining historical data of one or more purchases of at least one of a used version of the item and a new version of the item.

5. The method of claim 1, further comprising making an optimal point determination.

6. The method of claim 1, further comprising creating one or more models for one or more regions with one or more third party outlets.

7. The method of claim 6, further comprising quantifying a similarity between the one or more models to obtain segregation in a customer base.

8. The method of claim 1, wherein the historical data of one or more previous purchases for the item comprises a price of the item over a selected time period, and wherein obtaining the historical data further comprises performing price normalization over the selected time period by analyzing a past pricing trend.

9. The method of claim 1, wherein the historical data of one or more previous purchases for the item comprise historical data indicating success and failure in purchasing a used version of the item.

10. The method of claim 1, wherein performing the regression comprises taking into account parameters of the item including age of the item, location of the item, and waiting time in an inventory of the item against its price.

11. A non-transitory computer program product comprising a tangible computer readable recordable storage medium having computer readable program code for automated pricing of an item, said computer program product including:
    computer readable program code for obtaining historical data of one or more previous purchases for the item;
    computer readable program code for performing a regression with non-zero utilities on the historical data to obtain a buying probability curve for a third party that shows the probability of successfully purchasing the item as a function of value of the item and to obtain a selling probability curve for the third party that shows the probability (P) of the item being sold as a function of price of the item, wherein performing the regression comprises taking into account refurbishment costs of the third party via $$P(C=1 \mid V, x) = \frac{1}{1+\exp(-m(v(z)+k-V))},$$

wherein C denotes a random variable in {0,1} indicating failure or success of selling the item, V is a price of the item (x) offered to the third party, and v(z)+k represents the value of the refurbished item; and computer readable program code for using the regression to obtain a buying price and a selling price for the item that optimizes revenue for the third party by deriving an operating region using the buying probability curve and the selling probability curve, wherein the third party is buying the item from a first party and selling the item to a second party.

12. The non-transitory computer program product of claim 11, further comprising computer readable program code for making an optimal point determination.

13. The non-transitory computer program product of claim 11, wherein the item comprises a vehicle, and further comprising computer readable program code for using the regression to perform vehicle bidding.

14. The non-transitory computer program product of claim 11, wherein performing the regression comprises taking into account parameters of the item including age of the item, location of the item, and waiting time in an inventory of the item against its price.

15. A system for automated pricing of an item, comprising:
a memory; and
at least one processor coupled to said memory and operative to:
   obtain historical data of one or more previous purchases for the item;
   perform a regression with non-zero utilities on the historical data to obtain a buying probability curve for a third party that shows the probability of successfully purchasing the item as a function of value of the item and to obtain a selling probability curve for the third party that shows the probability (P) of the item being sold as a function of price of the item, wherein performing the regression comprises taking into account refurbishment costs of the third party via $$P(C=1 \mid V, x) = \frac{1}{1+\exp(-m(v(z)+k-V))},$$

wherein C denotes a random variable in $\{0,1\}$ indicating failure or success of selling the item, V is a price of the item (x) offered to the third party, and $v(z)+k$ represents the value of the refurbished item; and
   use the regression to obtain a buying price and a selling price for the item that optimizes revenue for the third party by deriving an operating region using the buying probability curve and the selling probability curve, wherein the third party is buying the item from a first party and selling the item to a second party.

16. The system of claim 15, wherein the at least one processor coupled to said memory is further operative to make an optimal point determination.

17. The system of claim 15, wherein performing the regression comprises taking into account parameters of the item including age of the item, location of the item, and waiting time in an inventory of the item against its price.

* * * * *